Patented Aug. 25, 1942

2,293,868

UNITED STATES PATENT OFFICE 2,293,868

POLYMERIZATION PRODUCTS

Walter J. Toussaint, South Charleston, W. Va., assignor to Carbide and Carbon Chemicals Corporation, a corporation of New York No Drawing. Application December 29, 1939, Serial No. 311,659

11 Claims. (Cl. 260—338)

This invention relates to an improvement in catalytic processes for making addition products of alkylene oxides or of alkylene oxides with glycols or polyglycols.

The chemical reactions to which the invention appertains include the dimerization of an alkylene oxide to dioxan or to a derivative thereof, the extensive polymerization of the alkylene oxide to form derivatives of high molecular weight, and the reaction of the alkylene oxides with glycols or polyglycols to form higher polyglycols. Catalysts which have been proposed for aiding addition reactions such as these comprise acidic substances, exemplified by zinc chloride, tin tetrachloride, ferric chloride, titanium tetrachloride, aluminum sulfate, sodium acid sulfate and sulfuric acid, as well as basic compounds, typified by sodium and potassium hydroxides. It has been found by test that the various acidic catalysts mentioned do not accelerate appreciably the rate at which addition reactions of this type proceed, unless they are employed in excessive quantities. Further experiments have also shown that the basic materials, although they possess satisfactory catalytic properties for such reactions, may promote the formation of brown or discolored products which are difficult to purify.

The object of this invention is, therefore, to provide a process for making addition products of the nature described which is rapid and which results in colorless or light colored products.

The present discovery achieves this object by the use of an acidic compound of fluorine as a catalyst for promoting reactions of the type referred to above. A substance of this class having outstanding catalytic activity in this respect is boron trifluoride, although other acidic compounds of fluorine such as hydrofluoric acid, silicon tetrafluoride, or hydrofluosilicic acid, are effective. Boron trifluoride may be used by itself or the complex addition compound which it forms with ethers, notably diethyl ether, may be employed. Other ethers, of both the alkyl and aryl series, may be substituted for diethyl ether for this purpose.

In more detail, the reactions for which the acidic compounds of fluorine have been shown to be extremely effective catalysts, are: (1) the dimerization of ethylene oxide to 1,4 dioxan; (2) the polymerization of either ethylene or propylene oxide to form alkylene oxide addition products whose molecular weight may be 1200 or higher; and (3) the addition reaction of these alkylene oxides with glycols or the lower polyglycols, or their monoethers or esters, to form long chain polyglycols, or monoethers or esters thereof. For example, alkylene oxides may be reacted with ethylene glycol, propylene glycol, butylene glycol, the corresponding di-, tri- and tetraglycols, or the alkylene oxides may be reacted with the monoethers or esters of the foregoing compounds. These glycols and their polyglycol modifications are included in the class defined as lower members of the alkylene glycol series. The addition reactions of this invention may be carried out at temperatures ranging from about 20° C. to about 150° C. and they may be conducted at sub-atmospheric or superatmospheric pressures, although atmospheric pressure is satisfactory.

The use of boron trifluoride, or a similar acidic compound of fluorine, in reactions of this type is characterized by its high degree of effectiveness, even in small quantities, and by its ability to promote the formation of colorless or light colored products. The comparative advantages of boron trifluoride as a catalyst in these addition reactions is demonstrated in the table below wherein its effectiveness in promoting the reaction of ethylene oxide with triethylene glycol to form products having an average molecular weight corresponding to hexaethylene glycol is compared with that of sulfuric acid, a substance previously highly advocated for this purpose.

| Catalyst | Amount (percent by weight) of reactants | Temp. | Time for complete reaction | Color of product |
|---|---|---|---|---|
| | | °C. | Hours | |
| Boron trifluoride | 0.04 | 100 | 1.1 | Colorless. |
| Sulfuric acid | 3.0 | 100 | 4.0 | Light brown. |
| Sulfuric acid [1] | 5.0 | 100 | 1.7 | Do. |

[1] Added in small quantities at intervals.

It is obvious from this comparison that, on a basis of catalytic action per unit amount of catalyst present, boron trifluoride is over one hundred times as effective as sulfuric acid. In addition, boron trifluoride produces colorless products and is also more readily removed from the reaction products. For instance, by gentle heating of the reaction product under vacuum, the boron trifluoride may be vaporized and removed. On the contrary, sulfuric acid apparently forms complex sulfate esters with the reaction products from which it can be separated only by hydrolysis.

The high molecular weight polyglycols, or their monoethers or esters, possess technically valuable properties. Many of them dissolve or disperse readily in water and they are useful as wetting and foaming agents and as detergents. They find wide employment for softening leather and in treating textiles. The compounds may also be used as emulsifying or dispersing agents and, in this respect, they are especially valuable in the preparation of cosmetic creams. In addition, their plasticizing action on resins and cellulose derivatives makes them attractive for many applications. Finally, they may replace glycerine in many fields, especially where a material of lower volatility and hygroscopicity is needed.

The following examples will serve to illustrate the invention:

Example 1

Boron trifluoride was added to diethyl ether and the complex compound of boron trifluoride and diethyl ether was recovered by distillation. Two parts by weight of this substance were dissolved in 100 parts of diethylene glycol. The temperature was raised to 60° to 65° C. and 2526 parts of ethylene oxide were diffused into this solution during a period of seven hours. Sodium acetate was then added to neutralize the catalyst and the volatile products of the reaction, consisting mainly of dioxan, were removed by distillation under vacuum. The residue from this distillation consisted of 1925 parts of a viscous colorless polyglycol having an average molecular weight of 1516; the molecular weights being determined by acetylation of the free hydroxyl groups.

Example 2

One part by weight of the complex compound of boron trifluoride with diethyl ether was dissolved in 500 grams of diethylene glycol. One thousand, five hundred and ninety two (1592) parts of ethylene oxide were then passed into the solution at a temperature of 65° to 70° C. during a period of 22 hours. The catalyst was neutralized with sodium acetate and the volatile constituents remaining in the reaction vessel, consisting mainly of unreacted ethylene oxide and dioxan, where removed by evaporation under vacuum. Two thousand and ten (2010) parts of a polyglycol, having an average molecular weight of 410, were obtained as a residue. The product was characterized by the absence of color.

Example 3

This example shows the wide difference in catalytic activity between boron trifluoride and other acidic substances, such as sulfuric acid.

Sulfuric acid, to the extent of 0.5% by weight, was added to a solution of two parts by weight of ethylene chlorhydrin and one part of ethylene oxide. At ordinary temperatures no reaction occurred. The experiment was repeated at a temperature of 90° C. by passing ethylene oxide into ethylene chlorhydrin containing 0.2% by weight sulfuric acid. At the end of 20.5 hours, only 0.6 part of ethylene oxide per part of ethylene chlorhydrin by weight was reacted before absorption and reaction of the ethylene oxide ceased. On the other hand, when ethylene oxide was passed into ethylene chlorhydrin containing 0.1% by weight boron trifluoride, a vigorous reaction occurred and the temperature rose to 96° C. During a reaction time of 9 hours, 4.2 parts of ethylene oxide by weight had reacted per part of ethylene chlorhydrin to yield a polyglycol chlorhydrin. These experiments indicated that boron trifluoride on a basis of yield per unit time per unit of catalyst is about 32 times as effective a catalyst for this reaction as is sulfuric acid.

Example 4

Five parts by weight of boron trifluoride-diethyl ether complex were dissolved in 735 parts of an inert material, ethylene dichloride. Eight hundred and sixteen (816) parts by weight of ethylene oxide were then passed into this solution at a temperature of about 30° C. Upon neutralization of the catalyst with sodium acetate, 568 parts by weight of dioxan were distilled from the reaction products, leaving 223 parts of high boiling polyethylene glycols as a residue. The overall conversion of ethylene oxide was 97% and the yield of dioxan was 69.5%.

Example 5

Four parts by weight of hydrogen fluoride were added to 170 parts by weight of diethylene glycol. The temperature was maintained at 100 to 105° C. and 1493 parts by weight of ethylene oxide were introduced during 5.8 hours. At the end of this period, the catalyst was neutralized by the addition of 19 parts of sodium acetate and the reaction products distilled at a temperature of 250° C. and under an absolute pressure of 2 mm. Two hundred and fifty-six (256) parts of distillate, consisting principally of dioxan, were obtained and 1404 parts of high boiling polyethylene glycols remained as a residue.

Modifications of the invention other than as described in the foregoing examples will be readily apparent to those skilled in the art and are included within the invention as defined in the appended claims.

What is claimed is:

1. Process for making colorless or light colored alkylene oxide addition products which comprises bringing a 1,2-alkylene oxide having from two to three carbon atoms to the molecule in effective contact with one of the group consisting of 1,2-alkylene oxides having two to three carbon atoms to the molecule, lower members of the alkylene glycol series, and mono substituted lower members of the alkylene glycol series which have only one free hydroxyl group in the molecule, and causing at least one mol of said alkylene oxide to add to one of said group in the presence of an acidic compound of fluorine; and recovering an alkylene oxide addition product.

2. Process for making colorless or light colored alkylene oxide addition products which comprises bringing a 1,2-alkylene oxide having from two to three carbon atoms to the molecule in effective contact with one of the group consisting of 1,2-alkylene oxides having two to three carbon atoms to the molecule, lower members of the alkylene glycol series, and mono substituted lower members of the alkylene glycol series which have only one free hydroxyl group in the molecule, and causing at least one mol of said alkylene oxide to add to one of said group in the presence of boron trifluoride as a catalyst; and recovering an alkylene oxide addition product.

3. Process for making colorless or light colored alkylene oxide addition products which comprises bringing a 1,2-alkylene oxide having from two to three carbon atoms to the molecule in effective contact with one of the group consisting of 1,2-alkylene oxides having two to three carbon atoms to the molecule, lower members of the alkylene glycol series, and mono substituted lower members of the alkylene glycol series which have only one free hydroxyl group in the molecule, and causing at least one mol of said alkylene oxide to add to one of said group in the presence of a complex compound of boron trifluoride with an ether as a catalyst; and recovering an alkylene oxide addition product.

4. Process for making high boiling polyalkylene glycols which comprises bringing a 1,2-alkylene oxide having from two to three carbon atoms to the molecule in effective contact with a lower member of the alkylene glycol series, and causing more than one mol of said alkylene oxide to add to said lower alkylene glycol in the presence of an acidic compound of fluorine as a catalyst; and recovering a high boiling polyalkylene glycol.

5. Process for making high boiling polyalkylene glycols which comprises bringing a 1,2-alkylene oxide having from two to three carbon atoms to the molecule in effective contact with a lower member of the alkylene glycol series, and causing more than one mol of said alkylene oxide to add to said lower alkylene glycol in the presence of boron trifluoride as a catalyst; and recovering a high boiling polyalkylene glycol.

6. Process for making high boiling polyalkylene glycols which comprises bringing a 1,2-alkylene oxide having from two to three carbon atoms to the molecule in effective contact with a lower member of the alkylene glycol series, and causing more than one mol of said alkylene oxide to add to said lower alkylene glycol in the presence of a complex compound of boron trifluoride with an ether as a catalyst; and recovering a high boiling polyalkylene glycol.

7. Process for making substantially colorless, high boiling polyethylene glycols which comprises bringing ethylene oxide in effective contact with a lower member of the ethylene glycol series, causing more than one mol of ethylene oxide to add to said lower ethylene glycol in the presence of boron trifluoride as a catalyst, and recovering a high boiling polyethylene glycol.

8. Process for making polymerization products of 1,2-alkylene oxides having from two to three carbon atoms to the molecule, which comprises forming a reaction mixture containing said alkylene oxide and an acidic compound of fluorine as a catalyst, and causing at least two mols of said alkylene oxide to unite by addition; and recovering a polymerization product.

9. Process for making dioxan which comprises dimerizing ethylene oxide in the presence of boron trifluoride as a catalyst.

10. Process for making high boiling mono substituted polyalkylene glycols which comprises bringing a 1,2-alkylene oxide having from two to three carbon atoms to the molecule in effective contact with a mono substituted lower member of the alkylene glycol series which contains only one free hydroxyl group in the molecule, and causing more than one mol of said alkylene oxide to add to said lower mono substituted polyalkylene glycol in the presence of an acidic compound of fluorine as a catalyst; and recovering a high boiling mono substituted polyalkylene glycol.

11. Process for making substantially colorless, high boiling mono substituted polyethylene glycols which comprises bringing ethylene oxide in effective contact with a mono substituted lower member of the alkylene glycol series which contains only one free hydroxyl group in the molecule, and causing more than one mole of said alkylene oxide to add to said lower mono substituted alkylene glycol in the presence of boron trifluoride as a catalyst; and recovering a high boiling mono substituted polyalkylene glycol.

WALTER J. TOUSSAINT.